United States Patent [19]

Jaques

[11] 4,038,350
[45] July 26, 1977

[54] METHOD OF PRODUCING INTEGRAL NON-FOAMED SKIN LAYER SHAPED ARTICLES

[75] Inventor: Geoffrey Sanderson Jaques, Runcorn, England

[73] Assignee: Imperial Chemical Industries Limited, London, England

[21] Appl. No.: 540,274

[22] Filed: Jan. 10, 1975

[30] Foreign Application Priority Data

Jan. 10, 1974  United Kingdom ................ 1190/74

[51] Int. Cl.² ............................................ B29D 27/04
[52] U.S. Cl. ................................. 264/22; 204/159.15; 204/159.18; 204/159.20; 260/2.5 N; 264/45.3; 264/45.5; 264/53; 264/54; 264/331; 264/DIG. 5; 264/DIG. 14; 264/DIG. 17; 428/315; 428/320; 428/322
[58] Field of Search ...... 264/45.5, DIG. 14, DIG. 18, 264/45.3, 53, 54, 331, DIG. 5, DIG. 17; 204/159.15, 159.19

[56] References Cited

U.S. PATENT DOCUMENTS

| | | | |
|---|---|---|---|
| 3,562,367 | 2/1971 | Shinohara et al. | 264/54 X |
| 3,600,336 | 8/1971 | Okada et al. | 204/159.15 X |
| 3,655,542 | 4/1972 | Tamai et al. | 204/159.15 X |
| 3,681,103 | 8/1972 | Brown | 204/159.15 X |
| 3,721,723 | 3/1973 | Heidel | 204/159.15 X |
| 3,802,949 | 4/1974 | Brown et al. | 264/53 X |
| 3,876,446 | 4/1975 | Bleckmann et al. | 204/159.15 X |
| 3,926,755 | 12/1975 | Marans et al. | 204/159.15 |
| 3,954,924 | 5/1976 | Castro et al. | 264/DIG. 14 |

FOREIGN PATENT DOCUMENTS

| | | | |
|---|---|---|---|
| 1,369,216 | 10/1974 | United Kingdom | 204/159.15 |
| 1,408,265 | 10/1975 | United Kingdom | 204/159.15 |
| 1,308,637 | 2/1973 | United Kingdom | 264/DIG. 14 |

*Primary Examiner*—Philip Anderson
*Attorney, Agent, or Firm*—Cushman, Darby & Cushman

[57] ABSTRACT

Shaped articles comprising a polymeric frame of uniform density having one or more substantially non-foamed skin layers over all, or only a part of, its surface are produced according to the disclosed method which includes forming a foamable mixture of a photopolymerizable ethylenically unsaturated material, such as vinyl acetate, acrylonitrile, unsaturated polyester resins or the like, and a foaming agent therefor in a mould, subjecting part or all of the surface of the mixture retained in the mould to radiation of a wavelength such that photopolymerization of the material occurs forming a non-foamed or non-foamable skin layer or layers. The thus treated foamable mixture is then foamed and the ethylenically unsaturated material in the foam is polymerized. Shaped articles so produced having an open shell structure are also disclosed.

20 Claims, No Drawings

METHOD OF PRODUCING INTEGRAL NON-FOAMED SKIN LAYER SHAPED ARTICLES

BACKGROUND OF THE INVENTION

This invention relates to foam materials and particularly to a method for manufacturing shaped articles comprising a foam having an integral non-foamed skin layer on at least a part of the surface of the foam.

Shaped articles, for example sheet materials, are known which consist of a foamed polymer core having a dense covering formed integrally with the core. In these known articles the density of the material of which they are made decrease steadily from the outer surface towards the centre. The articles are made by foaming a foamable mixture of the precursors of cured resins in which a blowing agent is incorporated, at a temperature sufficient to cause foaming, in closed moulds which are maintained at a temperature below that at which foaming can occur. In this way a temperature difference, usually of 20° C or more, is established between the centre of the mixture and its external surface which is in contact with the mould, with the result that the mixture in the centre is foamed whilst the mixture in contact with the mould is substantially prevented from foaming. The mixture may comprise the precursors of a polyurethane or the precursors of a cured polyester resin, that is an ethylenically unsaturated polyester and an ethylenically unsaturated monomer which is copolymerisable with the polyester. After foaming is completed the polymer is cured, either by a polyaddition reaction in the case of a polyurethane or by a copolymerisation reaction in the case of a cured polyester resin. Alternatively the mixture may comprise the precursors of a cured polyester resin and a polyisocyanate, as described in British Pat. Specification No. 1,308,637, in which case curing will be by both polyaddition and copolymerisation.

This known method of producing shaped articles requires strict temperature control in order to ensure a dense covering in which minimum foaming has occurred whilst ensuring that the core is foamed satisfactorily, and is difficult to operate with satisfactory and readily reproducible results. Moreover the resulting articles have a steadily decreasing density from the outer surface towards the centre and the process is unsuitable for the production of articles having a non-foamed skin layer and a foam body of uniform density. The process is unsuitable for the production of articles having clearly defined skin and foam layers and is unable to produce articles having a thin skin layer. The articles produced by the process have a very low volume:weight ratio compared with articles made by completely foaming the mixtures and is wasteful of starting materials. Further the process produces an article wherein the foam core is completely covered by a skin and is not readily adaptable to the production of articles wherein only a portion of the surface of the foam, for example one side of a sheet of the foam, is covered by a skin.

We have now devised a method for the production of shaped articles comprising a polymeric foam of uniform density having one or more substantially non-foamed skin layers over all or part of its surface, which method is easily carried out and does not require establishment of a temperature difference between the external surface of the foamable mixture and its centre and which obviates the need for strict temperature control of the foaming reaction. In our method, which employs a foamable mixture of a polymerisable material, the skin layer or layers is/are formed before the foaming reaction is commenced and thereafter the remaining portion of the mixture is foamed and the foam subsequently set by polymerisation of the polymerisable material. The products of our process have clearly defined skin and foam layers, and very thin skin layers, for example layers of thickness 10 thousandths of an inch or less, can be produced. The foam body is substantially completely foamed material so that the products have a high volume:weight ratio compared with the products of the known process.

DETAILED DESCRIPTION OF THE INVENTION

According to the invention, we provide a method for the manufacture of a shaped article comprising a shaped polymeric foam of substantially uniform density having at least one substantially non-foamed outer skin layer over at least a part of its surface, the foam and the skin layer or layers being produced by polymerisation of one or more polymerisable ethylenically unsaturated materials.

According to the invention also, we provide a method for the production of shaped articles which comprises forming a foamable mixture of a photopolymerisable ethylenically unsaturated material and a foaming agent in a mould, subjecting at least a part of the surface of the mixture in the mould to radiation of wavelength such that photopolymerisation of the ethylenically unsaturated material occurs to form a non-foamed and non-foamable skin layer or layers and subsequently foaming the foamable mixture and polymerising the ethylenically unsaturated material in the foam.

According to a further feature of the invention we provide a method for the manufacture of a shaped article comprising a shaped polymeric foam having at least one substantially non-foamed outer skin layer over at least a part of its surface, the foam and the skin layer or layers being produced by polymerisation of a polymerisable ethylenically unsaturated material and at least the skin layer or layers being produced by photopolymerisation of a photopolymerisable ethylenically unsaturated material.

The term "photopolymerisable ethylenically unsaturated materials" as used herein is not restricted to materials which are inherently photopolymerisable but includes mixtures of ethylenically unsaturated materials with photosensitisers which absorb suitable radiation to yield as excited species capable of initiating polymerisation of the ethylenically unsaturated material.

In carrying out the process of the invention, a mixture of a photopolymerisable ethylenically unsaturated material and a foaming or blowing agent is provided in a mould. The mixture may be added to the mould as a pre-formed mixture or it may be prepared in situ. Formation of the mixture in the mould should be effected at a temperature below that at which foaming of the mixture can occur and the foaming, or blowing, agent may be chosen such that preparation of the mixture can be carried out at any desired temperature. For convenience, charging of the mould is usually carried out at room temperature though higher or lower temperatures may be employed if desired. The surface of the mixture or one or more parts of this surface are then exposed to radiation, for example visible or ultraviolet radiation, from a suitable source, and the mould or the relevant parts thereof must be constructed of a suitable material, for example glass, to permit irradiation of the mixture. In this way polymerisation of the ethylenically unsaturated material in the mixture is effected and a non-foamed and non-foamable skin layer of the resulting polymer is formed on that part of the surface of the mixture which is exposed to the radiation. The thickness of the polymeric skin layer can be controlled to any desired value in a number of ways, for example by selection of the photosensitiser and radiation source employed, by varying the distance between the radiation source and the mould and the time for which the mixture is irradiated before foaming is effected, by incorporating in the mixture substances, for example pigments, which limit the depth of penetration of the radiation into the mixture, or by a combination of these variants.

The temperature at which the mixture is subjected to radiation of suitable wavelength should be, at least initially, below the temperature at which foaming of the mixture occurs so that formation of the non-foamable skin layer is completed before foaming of the mixture is commenced. The photopolymerisation of the ethylenically unsaturated material, however, is usually accompanied by a rise in temperature of the mixture so that whilst irradiation is commenced at a temperature below the foaming temperature, for example room temperature, the mixture may become heated to a temperature at which foaming does occur. This is acceptable providing the skin layer has attained sufficient thickness and strength to resist being foamed. It is not necessary that polymerisation of the material forming the skin layer be completed before the foaming is effected provided that the layer has sufficient strength to resist foaming and the polymerisation can be completed during the foaming reaction and/or during polymerisation of the material of the foam. The time for which the surface of the mixture is subjected to radiation before foaming is commenced is not critical and can be selected to yield any desired thickness of the skin layer. Usually the time will be from 30 seconds to 10 minutes; the optimum time for any particular set of conditions and requirements can be determined by simple experiment. At least those surfaces of the mixture to be skinned usually will be in contact with the smooth internal surface of the mould so that a skin layer having a smooth and pleasing appearance is obtained. A mould having provision for expansion during the foaming reaction can be used to produce the article especially in the case of articles which comprise a completely-skinned foam.

After formation of a skin layer or layers of at least sufficient strength to resist foaming the remaining portion of the mixture is foamed, usually simply by raising the temperatures of the mixture. Any of the known blowing agents may be employed to effect the foaming, for example low boiling point liquids, especially chlorinated and fluorinated hydrocarbons of boiling point below 50° C, and ammonium bicarbonate. Examples of suitable liquid blowing agents are methylene chloride, ethylene chloride and vinylidene chloride, trichlorofluoromethane, dichlorodifluoromethane, 1,1,2-trichloro-1,2,2-trifluoroethane and dibromodifluoromethane. Upon completion of the foaming reaction the resulting foam is set or cured by polymerising the polymerisable ethylenically unsaturated material.

Polymerisation of the ethylenically unsaturated material after foaming can be effected by photopolymerisation upon radiation from a suitable source provided that the radiation is able to penetrate through the foamed material which accordingly should not contain too much pigment or filler which absorbs the radiation. Alternatively, or additionally, polymerisation may be effected by means of a free-radical agent incorporated in the mixture which agent initiates polymerisation upon heating of the mixture to a suitable temperature. The polymerisation may be carried out at the same temperature at which foaming occurs but in this case the foaming reaction should be completed before polymerisation has proceeded to the extent that the mixture has become non-foamable. The optimum temperatures for effecting the foaming and polymerisation reactions will depend upon the particular foaming agent(s) and free-radical agent(s) employed but can be determined by simple experiment.

The photopolymerisable ethylenically unsaturated material which preferably also is free-radically polymerisable, may comprise for example, at least one monomer containing ethylenic unsaturation in a terminal group. For example, the ethylenically unsaturated material may be one or more monomers selected from vinyl monomers, allyl monomers and vinylidene monomers.

Suitable vinyl monomers which may be polymerised include, for example, vinyl esters, aromatic vinyl compounds and vinyl nitriles.

Vinyl esters suitable for use in the method of our invention include, for example, vinyl acetate and esters of acrylic acid having the structure $CH_2CH - COOR$, where R is an alkyl, aryl, alkaryl, aralkyl or cycloalkyl group. For example, R may be an alkyl group having from 1 to 20, and preferably 1 to 10, carbon atoms. Particular vinyl esters which may be mentioned include, for example, methyl acrylate, ethyl acrylate, n- and isopropyl acrylates, and n-, iso- and tertiary butyl acrylates.

Other suitable vinyl esters include, for example, esters of the formula $CH_2 = C(R_1)COOR$, where $R_1$ is methyl.

In the ester of formula $CH_2 = C(R_1)COOR$, R and $R_1$ may be the same or different. Particular vinyl esters which may be mentioned include, for example, methyl methacrylate, ethyl methacrylate, n- and isopropylmethacrylate, and n-, iso- and tertiary butyl methacrylate. Suitable aromatic vinyl compounds include, for example, styrene and derivatives thereof, e.g. α-alkyl derivatives of styrene, e.g. α-methyl styrene, and vinyl toluene.

Suitable vinyl nitriles include, for example, acrylonitrile and derivatives thereof, e.g. methacrylonitrile.

Other suitable vinyl monomers include vinyl pyrollidone, and hydroxyalkyl acrylates and methacrylates, e.g. hydroxyethyl acrylate, hydroxypropylacrylate, hydroxyethyl methacrylate and hydroxypropylmethacrylate.

The photopolymerisable ethylenically unsaturated material may include at least one ethylenically unsaturated polymer, preferably in combination with at least one ethylenically unsaturated monomer. For example, the ethylenically unsaturated polymer may be an ethylenically unsaturated polyester formed by condensation of at least one ethylenically unsaturated polycarboxylic acid or anhydride, optionally in combination with at least one saturated polycarboxylic acid or anhydride, with at least one polyol.

Where the photopolymerisable composition includes a mixture of an ethylenically unsaturated polyester and an ethylenically unsaturated monomer the polyester and monomer may, for example, be present in the composition in a proportion by weight of polyester:monomer of 99:1 to 1:99, preferably 90:10 to 10:90.

The ethylenically unsaturated monomer may be, or may include, a polyfunctional monomer polymerisation of which will lead to the production of cross-linked materials. Suitable polyfunctional ethylenically unsaturated monomers include, for example, divinyl benzene, glycol dimethacrylate and a reaction product of a hydroxyalkyl acrylate or methacrylate with an isocyanate-ended adduct of a diol and a diisocyanate, for example, a reaction product of hydroxy ethyl methacrylate and an isocyanate-ended adduct of 4:4'-diphenyl methane diisocynanate and oxypropylated Bisphenol-A.

Where the ethylenically unsaturated material is a solid then it may be convenient, in order to produce a liquid composition, to include in the composition sufficient amount of a suitable diluent. The diluent should, of course, have little or no inhibiting effect on the polymerisation of the ethylenically unsaturated material in the composition.

As is hereinbefore described the photopolymerisable ethylenically unsaturated material may include an ethylenically unsaturated polymer and in particular may be a mixture of an ethylenically unsaturated polymer and an ethylenically unsaturated monomer copolymerisable with the polymer. The unsaturated material may also contain the precursors of a polyurethane. Thus the ethylenically unsaturated material may comprise an unsaturated monomer or an unsaturated polymer, preferably both, at least one of which may contain one or more groups reactive with isocyanate groups, and a polyisocyanate or the precursors of a polyurethane may be incorporated in the mixture. In this case reaction of the polyurethane pecursors and/or reaction of the polyisocyanate with the unsaturated polymer and/or the unsaturated monomer may be allowed to occur before, during or after foaming of the mixture, provided that the completed polyurethane reaction does not prevent foaming of the mixture, or providing alternatively that the reaction has not proceeded prior to effecting foaming to the extent that the mixture has become substantially non-foamable. In the case where a polyisocyanate or the precursors of a polyurethane is included in the composition then a photosensitiser and a reducing agent should be chosen which do not react with isocyanate groups.

Any photosensitiser may be employed in the mixtures used in our process which is capable of absorbing suitable radiation and initiating polymerisation of the ethylenically unsaturated material. Photosensitive dyes can be used in the production of coloured articles. We prefer to employ a mixture of a photosensitiser and a reducing agent capable of reducing the photosensitiser when the latter is in the excited state. Particularly useful combinations of photosensitisers and reducing agents which may be employed in the process of the present invention are described and claimed in our U.S. Pat. No. 3,819,491 and co-pendng U.S. application Ser. No. 294,781, filed Oct. 4, 1972 and now abandoned in favor of U.S. application Ser. No. 549,052, filed Feb. 11, 1975 and in which also are described photopolymerisable ethylenically unsaturated materials which are the preferred materials for use in our process. The descriptions in the co-pending applications are incorporated herein by the above reference.

As is described in co-pending U.S. application Ser. No. 549,052, filed Feb. 11, 1975 particularly preferred photosensitisers on account of the rapid rates at which ethylenically unsaturated materials may be polymerised are α-diketones, for example benzil and substituted benzils. We especially prefer to use α-diketones in combination with reducing agents. In general, the α-diketones are capable of being excited by radiation in the visible region of the spectrum, that is, by light having a wavelength greater than 400 mμ, e.g. in the wavelength range 400 mμ to 500 mμ, although ultraviolet radiation, or a mixture of ultraviolet radiation and visible light, may be used.

The photosensitiser may, for example, by present in the photopolymerisable composition in a concentration in the range 0.001 to 10% by weight of the ethylenically unsaturated material in the composition although concentrations outside this range may be used if desired. Suitably the photosensitiser is present in a concentration of 0.1% to 7%, and more preferably 0.5 to 5% by weight of the ethylenically unsaturated material in the composition.

The radiation employed to form the skin layer(s) and if desired to set the foam may be visible light, ultraviolet radiation or actinic radiation or radiation which includes within its spectrum radiation of visible, ultraviolet and/or actinic wavelengths. Suitably, the radiation may have a wavelength in the range 230 mμ to 600 mμ. Sunlight may be used as the source of radiation although the wavelength of radiation to be used will be determined by the particular photosensitiser in the composition, the radiation being of a wavelength such as to be absorbed by the photosensitiser so as to convert the photosensitiser to an excited state. A suitable wavelength may be chosen by means of simple experiment e.g. by measuring the electronic absorption spectrum of the photosensitiser.

The reducing agent, if present in the photopolymerisable composition should have a reduction potential such that it is capable of reducing the photosensitiser when the photosensitiser is in an excited state yet is incapable of reducing the photosensitiser when the latter is not excited by radiation. Furthermore, it is believed the reducing agent, when oxidised by the excited photosensitiser, should be capable of initiating polymerisation of the ethylenically unsaturated material. The reducing agent, at the concentration at which it is present in the photopolymerisable composition, should have little or no inhibiting effect on polymerisation. Whether or not a reducing agent has an inhibiting effect may be determined by means of simple experiment, for example, by effecting polymerisation of the ethylenically unsaturated material by means of a thermal initiator in the presence of, and in the absence of, a reducing agent in the desired concentration and comparing the rates of polymerisation in the presence and absence of the reducing agent.

Suitable reducing agents include compounds having the structure

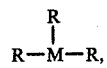

where M is an element of Group Vb of the Periodic Table of the Elements and the units R, which may be the same or different, are hydrogen atoms, hydrocarbyl groups, substituted hydrocarbyl groups or groups in which two units R together with the element M form a cyclic ring system, no more than two of the units R being hydrogen atoms, and where the element M is attached directly to an aromatic group R, at least one of the groups R has a

group attached to M.

The Periodic Table of the Elements referred to is that published in "Advanced Inorganic Chemistry," second edition, by F A Cotton and G Wilkinson (Interscience 1966).

Preferably, the reducing agent having the structure

is free of aromatic groups attached directly to the element M.

The element M in the reducing agent may be, for example, phosphorous or more preferably nitrogen. If desired, M may be arsenic or antimony.

The reducing agent may be primary, secondary or tertiary, that is, in the structure

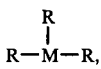

two, one or none of the units R respectively may be hydrogen atoms. For example, the reducing agent may be a primary, secondary or tertiary amine or phosphine.

One or more of the groups R may be hydrocarbyl. The hydrocarbyl group may be, for example, alkyl, cycloalkyl or alkaryl. Suitably, the group R may be an alkyl group having from 1 to 10 carbon atoms.

Examples of suitable reducing agents in which one or more of the units R is hydrocarbyl include propylamine, n-butylamine, pentylamine, hexylamine, dimethylamine, diethylamine, dipropylamine, di-n-butylamine, dipentylamine, trimethylamine, triethylamine, tripropylamine, tri-n-butylamine, tripentylamine, dimethylaminoethyl methacrylate, and long chain fatty amines, e.g. $C_{18}H_{37}NMe_2$. Examples of reducing agents containing aromatic groups include N,N'-dimethyl aniline and N-methyl diphenylamine.

Suitably the concentration of the reducing agent may be in the ranges hereinbefore described in respect of the photosensitiser although concentrations outside these ranges may be used if desired. Preferably, the reducing agent is present in a concentration of 1% to 5% by weight of the ethylenically unsaturated material in the photopolymerisable composition.

Where one or more of the groups R in the reducing agent

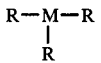

is aromatic then it is preferred to have a concentration of reducing agent in the photopolymerisable composition in the range 0.01 to 0.5% by weight of the ethylenically unsaturated material in the composition on account of the more rapid rates of polymerisation which may be obtained when the reducing agent is present in this concentration range.

The photosensitiser and the reducing agent desirably should be soluble in the ethylenically unsaturated material at least to an extent sufficient to give the desired concentration therein. Although polymerisation will proceed if the photosensitiser and reducing agent are not completely soluble it is much preferred that the photosensitiser and the reducing agent are together completely soluble in the ethylenically unsaturated material to the desired extent.

The method of mixing of the photosensitiser and reducing agent with the ethylenically unsaturated material may have a bearing on the success or otherwise of achieving the desired concentrations of photosensitiser and reducing agent therein.

Thus, where the photosensitiser or reducing agent is not sufficiently soluble in the ethylenically unsaturated material, or where one or the other may be dissolved only with difficulty, we have found that dissolution of the photosensitiser and/or reducing agent may be assisted by addition to the ethylenically unsaturated material of a small amount of a diluent in which the photosensitiser or reducing agent is soluble and which is miscible with the ethylenically unsaturated material. Suitably, the photosensitiser or reducing agent may be introduced into the ethylenically unsaturated material in the form of a solution in such a diluent. The photosensitiser and reducing agent may be dissolved in the same batch of a suitable diluent and then added to the ethylenically unsaturated material. Alternatively, the photosensitiser and reducing agent may be dissolved in different batches of the same or different diluents and added to the ethylenically unsaturated material.

The mixture used in the process of the present invention, especially mixtures which are to be used in the production of cross-linked materials, may contain pigments and/or fillers, e.g. fibrous materials, glass (fibres or powder) carbon black and calcium carbonate, which may be organic or inorganic. Where the composition contains a pigment a photosensitiser may be chosen which is excited by radiation having a wavelength which is not absorbed to an excessive extent by the pigment. Preferably, the pigment should be transparent to radiation at the wavelength which excites the photosensitiser. Where the pigment absorbs ultraviolet radiation but absorbs little or no radiation in the visible region of the spectrum those photosensitisers in the composition of our invention which are excited by visible light, for example, the α-diketones, are especially useful. Alternatively a pigment and a photosensitiser may be used which absorb approximately the same wavelength and in this case the concentration of the pigment may be adjusted so that the surface of the mixture can be polymerised to form the skin layer(s) whilst the depth of penetration of radiation into the mixture is controlled.

Other additives may be present in the photopolymerisable compositions, e.g. antioxidants, antiozonants, u.v. stabilisers, heat stabilisers and colouring materials.

The density of the foamed material may vary over a wide range depending on the end use which is envisaged for the foamed material. The density of the foam may be controlled by controlling the amount of blowing agent used and by exerting pressure on the mixture during foaming, for example by using a closed mould. Alternatively, where a foam of lower density is desired the amount of blowing agent used may be increased and the foaming may be effected in the absence of an applied pressure.

The foam may be of open cell or closed cell structure but usually the foams contain a high proportion, for example 80 to 90% of open cells. A surfactant may be used in order to assist the production of a foamed material having a uniform cell structure containing a high proportion of closed cells. Suitable surfactants include silicone fluids, ethylene oxide tipped oxypropylated ethylene glycol and octyl phenol/ethylene oxide condensates.

The pore size and distribution in the foam layers of the products of our invention are those generally obtained in the production of the corresponding foams by conventional techniques. For example we have found that pore size in a foamed unsaturated polyester layer may vary considerably, e.g. from $100\mu$ to $2000\mu$, a typical analysis being 100% of pores of diameter less than $2000\mu$, 90% of diameter less than $1000\mu$ and 75% of diameter less than $500\mu$. It will be appreciated that pore size and distribution may be affected by the presence of additives such as pigments, fillers and stabilisers, and by the concentration of such additives.

The skinned foams of the invention may be used in any of the applications for which skinned foams or laminates of foam layers and rigid layers are employed. For example the skinned foams may be used as construction materials in the erection of buildings and bunkers or in the manufacture of furniture, boats or vehicles, e.g. they may be used as prefabricated wall units for houses, offices, agricultural buildings and bunkers, structural members in boats, buildngs or vehicles, or as table tops or work benches. The skin layer or layers is firmly bonded to the foam layer and we have found that when the structure is subjected to stress, failure occurs by rupture of the foam rather than at the interface between the foam and the skin layer(s).

The invention is illustrated by way of example only by the following examples in which all parts are parts by weight.

EXAMPLE 1

A photopolymerisable, foamable, fluid mixture was prepared to the following formulation using an unsaturated polyester resin available under the trade name Crystic 199 from Scott-Bader:

|  | Parts |
| --- | --- |
| Unsaturated polyester resin | 300 |
| Clay | 150 |
| Ammonium bicarbonate | 30 |
| *Silicacell 7200 | 3 |
| Tertiary butyl perbenzoate | 3 |
| Dimethylaminoethanol | 9 |
| Benzil | 1.5 |
|  | 496.5 |

*A conventional foam-stabilizing agent

The mixture was poured at room temperature into, so as to fill completely, a mould of the picture-frame type (6 × 6 × ½ inch) having glass plates on either side, the mould having previously been coated with a release agent. The mould was irradiated on one side whilst held vertically with radiation from a Thorn MB1 PAR 64, 400 watt metal halide lamp placed at a distance of 18 inches from the mould. The lamp emits radiation of peak wavelength 415 m$\mu$ with minor peaks at 365, 405 and 435 m$\mu$. After 1½ minutes a gelled surface layer of thickness approx. 0.05 inch had formed on that surface of the mixture exposed to the radiation. At this time the mould was removed from the radiation and placed horizontally in a hot-air oven at a temperature of 130° C, with the gelled layer uppermost and the top glass plate was removed. The mixture foamed and rose to a skinned foam of thickness approx. 1 inch and the unsaturated polyester resin was cured. After 30 minutes the mould was removed from the oven and cooled and the product was removed from the mould.

The product was a uniform foam of thickness approx 1 inch having a smooth, glossy non-foamed skin layer of thickness approx. 0.05 inch firmly bonded to one side thereof. The density of the product was 35 lbs/ft$^3$ and its compressive strength was 500 pounds/inch$^2$. Rupture of the product under stress occurred in the foam layer whilst the interface between skin and foam layers was essentially undamaged.

EXAMPLE 2

A photopolymerisable, foamable, fluid mixture was prepared to the formulation:

|  | Parts |
| --- | --- |
| Unsaturated polyester resin (Crystic 199) | 300 |
| ¼" glass fibre | 100 |
| Ammonium bicarbonate | 15 |
| Silicacell 7200 | 3 |
| Tertiary butyl perbenzoate | 3 |
| Dimethylaminoethanol | 9 |
| Benzil | 1.5 |
| Blue pigment paste | approx 1 |
|  | 432.5 |

The mixture was charged to a mould, irradiated and foamed and cured in a hot-air oven as described in Example 1 except that radiation was for 2 minutes instead of 1½ minutes.

The product was a glass-fibre-reinforced, skinned foam having a smooth, non-foamed skin layer of thickness approx. 0.2 inch and a foamed layer of thickness approx. 0.4 inch. The density of the product was 58 lbs/ft$^3$. Rupture of the product under stress occurred in the foam layer whilst the interface between the skin and foam layers was essentially undamaged.

EXAMPLE 3

A composition was prepared to the formulation:

|  | Parts |
| --- | --- |
| Unsaturated Polyester Resin (Crystic 199) | 400 |
| ¼" glass fibre | 100 |
| Ammonium bicarbonate | 30 |
| Silicacell 7200 | 3 |
| Tertiary butyl perbenzoate | 3 |
| Dimethylaminoethanol | 9 |
| Benzil | 1.5 |
| Pigment | 3 |
|  | 549.5 |

The composition was charged to a mould, irradiated and foamed and cured as described in Example 1 except that both sides of the mould were irradiated for 3 minutes.

The product was a foam of substantially uniform density having on each side a non-foamed skin layer of thickness approx. 0.05 inch (1 cm). The product was of density 0.75 g cm$^3$.

What we claim is:

1. A method for the production of a shaped article which comprises forming a foamable mixture of a photopolymerisable ethylenically unsaturated material and a foaming agent in a mould, subjecting at least a part of the surface of the mixture in the mould to radiation of a wavelength such that photopolymerisation of the ethylenically unsaturated material occurs at said part of the surface to form a non-foamed and non-foamable skin layer and subsequently foaming the foamable mixture and polymerising the ethylenicaly unsaturated material in the foam.

2. A method as claimed in claim 1 wherein the foamable mixture is foamed by raising the temperature of the mixture.

3. A method as claimed in claim 1 wherein the photopolymerisable ethylenically unsaturated material comprises an ethylenically unsaturated material and a photosensitiser.

4. A method as claimed in claim 3 wherein irradiation of the mixture is with radiation having a wavelength in the range 230 mµ to 600 mµ.

5. A method as claimed in claim 1 wherein polymerisation of the ethylenically unsaturated material in the foam is by photopolymerisation.

6. A method as claimed in claim 1 wherein a free-radical agent is incorporated in the photopolymerisable ethylenically unsaturated material and polymerisation of the ethylenically unsaturated material in the foam is effected by raising the temperature of the foam.

7. A method as claimed in claim 1 wherein the ethylenically unsaturated material contains a photosensitiser in combination with a reducing agent capable of reducing the photosensitizer when said photosensitizer is in an excited state.

8. A method as claimed in claim 3, wherein the photosensitiser is an α-diketone.

9. A method as claimed in claim 8 wherein the photosensitiser is benzil.

10. A method as claimed in claim 8 wherein the photosensitiser is used in combination with a reducing agent having the structure

group where M is an element of Group Vb of the Periodic Table of the Elements and the units R, which may be the same or different, are hydrogen atoms, hydrocarbyl groups, substituted hydrocarbyl groups or groups in which two units R together with M form a cyclic ring system, no more than two of the units R being hydrogen atoms and where M is attached directly to an aromatic group R at least one of the units R has a

attached to M.

11. A method as claimed in claim 10 wherein the reducing agent is dimethyl aminoethyl methacrylate.

12. A method as claimed in claim 1 wherein the photopolymerisable ethylenically unsaturated material contains a photosensitiser in a concentration in the range 0.001% to 10% by weight of the ethylenically unsaturated material.

13. A method as claimed in claim 12 wherein the concentration of the photosensitiser is from 0.5 to 5% by weight of the ethylenically unsaturated material.

14. A method as claimed in claim 12 wherein the photosensitiser is employed in combination with a reducing agent in a concentration in the range 0.01% to 5% by weight of the ethylenically unsaturated material.

15. A method as claimed in claim 8 wherein the mixture is irradiated with radiation having a wavelength greater than 400 mµ.

16. A method as claimed in claim 1 wherein the blowing agent is ammonium bicarbonate.

17. A method as claimed in claim 1 wherein the blowing agent is a low boiling liquid.

18. A method as claimed in claim 17 wherein the liquid has a boiling point below 50° C.

19. A method as claimed in claim 1 wherein the mixture contains one or more pigments and/or fillers.

20. A method for producing a shaped article comprising (a) forming a foamable mixture of an ethylenically unsaturated material, a photosensitiser and a foaming agent in a mould; (b) subjecting at least a portion of the surface of said mixture in the mould to radiation having a wavelength in the range of 230 mµ to 600 mµ to photopolymerize said part of the surface of the ethylenically unsaturated material forming a non-foamed and non-foamable skin layer thereon; and subsequently (c) foaming the foamable mixture by raising the temperature of the foam and polymerising the ethylenically unsaturated material in the foam.

* * * * *